Patented Jan. 11, 1949

2,458,857

UNITED STATES PATENT OFFICE 2,458,857

METHOD OF PRODUCING METHYLFURAN

Iral B. Johns, Ames, Iowa, and Llewellyn W. Burnette, Easton, Pa., assignors to Iowa State College Research Foundation, Ames, Iowa, a corporation of Iowa No Drawing. Application September 21, 1945, Serial No. 617,926

5 Claims. (Cl. 260—345)

1

The present invention relates to improvements in the art of reducing furfural, particularly while the same is in vapor form, and for the particular purpose of producing therefrom methylfuran.

Numerous metals, such as nickel, platinum, palladium, and the oxides of platinum, have been proposed as catalysts for the reduction of furan derivatives, and in all cases the products of the hydrogenation have been a complex mixture. As a specific example, if furfural is reduced by the methods described in the prior art, furfuryl alcohol is first produced; however, the reaction does not stop at that point but may proceed as far as the formation of normal amyl alcohol. In addition to the low yield of the desired product, the control of those processes has been difficult.

An object of the present invention is a method whereby methylfuran may be prepared in substantially quantitative yields by the partial reduction of furfural. Another object is to provide a new and improved process for the production of methylfuran, which method obviates the disadvantages of the prior art reduction procedures. Other objects will be apparent as this invention is hereinafter more fully described.

In accordance with one aspect of the present invention, hydrogen is bubbled through a vessel containing furfural which is heated by any suitable means, such as an electrically-heated Wood's-metal bath. The temperature of the bath is held below the boiling point of furfural; above 110° C., and preferably from 125° C.–135° C. The furfural-laden hydrogen is then passed over a catalyst which is brought to the proper temperature by suitable heating means. The hydrogenation products, consisting of water, methylfuran, and the unchanged furfural, are condensed and the excess hydrogen recirculated through the catalyst chamber. After separating the water and organic layers, the methylfuran is purified by distillation.

While we have operated at temperatures of from 140° C.–280° C. for best results, we prefer to operate at about 200° C.–225° C. Temperatures over 280° C. are detrimental to catalyst activity, and at temperatures much below 200° C., the rate of hydrogenation is slow. In this process, we preferably operate in the presence of an excess of hydrogen which is constantly returned to the catalyst. By following the process as described in our invention in which about three times as much hydrogen as is theoretically required for the reduction of the furfural to methylfuran is used, yields up to 90 per cent of theory can be pro-

2 duced on a single passage through the catalyst chamber.

Any suitable carrier in conjunction with the catalyst may be employed. Alumina and silica gel may be satisfactorily employed. Activated carbon is outstanding as a carrier, giving unusually good results.

In order to disclose the nature of the present invention still more clearly, the following illustrative examples will hereinafter be described. All parts are by weight.

EXAMPLE 1

Preparation of the catalyst

One hundred parts of activated charcoal lumps (4–10 mesh) were added to a solution containing 100 parts of $Cu(NO_3)_2.6H_2O$, and $Cu(OH)_2$ was precipitated by the addition of a solution containing 25 parts of KOH. Because of the ease with which good results are obtained, we prefer to use activated charcoal as a carrier; however, other materials, such as activated alumina or silica gel, may be substituted. The mixture was washed five times in a Beuchner funnel with boiling water, placed in the catalyst chamber, and reduced at 210° C. to metallic copper in a stream of hydrogen and used as a catalyst as described below.

Reduction of furfural

Hydrogen was bubbled through a vessel containing furfural which was heated to 110° C. by means of an electrically-heated Wood's-metal bath. The furfural-laden hydrogen was then passed through the catalyst chamber which was preferably maintained at a temperature of 200° C. The hydrogenation products, consisting of water, methylfuran, and unchanged furfural, were condensed and the excess hydrogen was mixed with more furfural vapor and returned to the catalyst. After separating the water and organic layers, the methylfuran was purified by distillation. The yield of methylfuran was 65 per cent.

EXAMPLE 2

Preparation of the catalyst

A hot saturated solution of $Cu(C_2H_3O_2)_2.H_2O$ was poured over 100 parts of activated charcoal lumps, (4–10 mesh); the mixture was stirred and the liquid drained off. After the charcoal was nearly dry, the foregoing operation was repeated. On drying, the charcoal was well covered with blue-green crystals of copper acetate. It was placed in the catalyst chamber, dried, and decomposed at 250° C. overnight in a stream of hydrogen.

Reduction of furfural

The reduction was carried out with hydrogen in the same manner as given in Example 1. The yield of methylfuran was 80 per cent.

EXAMPLE 3

Preparation of the catalyst 1160 parts of a solution containing 260 parts of $Cu(NO_3)_2.3H_2O$ and 31 parts of $Ca(NO_3)_2$ were added to 995 parts of a solution containing 151 parts of $(NH_4)_2Cr_2O_7$ and 202 parts of 28% $NH_4OH$. The precipitate was filtered, the cake pressed with a spatula and sucked as dry as possible, after which it was dried in an oven at 75° C.–80° C. for twelve hours and then pulverized. In carrying out the decomposition, which was done in three portions in a casserole over a free flame, the powder was continuously stirred and the heating was so regulated that the evolution of gases did not become violent. When the entire mass had become black, the evolution of gases ceased; the powder was removed from the casserole and allowed to cool. The product was then leached for 30 minutes with 606 parts of 10 per cent acetic acid solution, filtered, washed with 600 parts of water in six portions, dried for 12 hours at 120° C., and pulverized. The resulting product was heated to a temperature of 325° C.–350° C. in a rotary kiln which gave a powder with definite brownish cast. The powder so obtained was sprinkled upon moistened activated charcoal. After the catalyst was distributed on the carbon, the mass was poured into the catalyst tube and heated to 200° C. in a slow stream of hydrogen. For best results, we prefer to use a ratio of powder to charcoal of from 1:2 to 1:1, and a charcoal of 4 to 10 mesh.

Reduction of furfural

The reduction was carried out with hydrogen in the same manner as given in Example 1. The yield of methylfuran was 90 per cent.

While the invention has been described in detail, particularly in connection with the examples, it is understood that such details may be modified widely by those skilled in the art without departing from the spirit of our invention.

We claim:

1. A process for the production of methylfuran from furfural, which comprises vaporizing furfural by bubbling hydrogen through said furfural at a temperature of 110° C.–135° C., passing said hydrogen admixed with furfural at a temperature of 140° C.–280° C. over a catalyst prepared by reducing an acid-leached copper calcium chromate.

2. A process for the production of methylfuran from furfural, which comprises vaporizing furfural by bubbling hydrogen through said furfural at a temperature of 110° C.–135° C., passing said hydrogen admixed with furfural at a temperature of 200° C.–225° C. over a catalyst prepared by reducing an acetic acid-leached copper calcium chromate.

3. A process for the production of methylfuran from furfural, which comprises vaporizing furfural by bubbling hydrogen through said furfural at a temperature of 110° C.–135° C., passing said hydrogen admixed with furfural at a temperature of 200° C.–225° C. over a catalyst prepared by reducing an acetic acid-leached copper calcium chromate, said catalyst being deposited upon charcoal.

4. A process for the production of methylfuran from furfural, which comprises vaporizing furfural by bubbling hydrogen through said furfural at a temperature of 110° C.–135° C., passing said hydrogen admixed with furfural at a temperature of 200° C.–225° C. over a catalyst prepared by calcining a copper-calcium-ammonium chromate, leaching said calcined chromate with dilute acetic acid and thereafter reducing the resultant copper-calcium-chromium oxide.

5. A process for the production of methylfuran from furfural, which comprises vaporizing furfural by bubbling hydrogen through said furfural at a temperature of 110°C.–135° C., passing said hydrogen admixed with furfural at a temperature of 140°C.–280° C. over a catalyst prepared by calcining a copper-calcium-ammonium chromate, leaching said calcinated chromate with dilute acetic acid and thereafter reducing the resultant copper-calcium-chromium oxide.

IRAL B. JOHNS.
LLEWELLYN W. BURNETTE.

REFERENCES CITED

The following references are of record in the file of this patent:

UNITED STATES PATENTS

| Number | Name | Date |
|---|---|---|
| 1,739,919 | Ricard et al | Dec. 17, 1929 |
| 1,746,782 | Lazier | Feb. 11, 1930 |
| 2,077,422 | Lazier | Apr. 20, 1937 |
| 2,089,433 | Salzberg | Aug. 10, 1937 |
| 2,273,484 | Guinot | Feb. 17, 1942 |
| 2,400,727 | Yale | May 21, 1946 |